Oct. 9, 1934.  H. JANDER  1,976,402
POWER OPERATED MECHANISM
Filed March 31, 1933   2 Sheets-Sheet 2
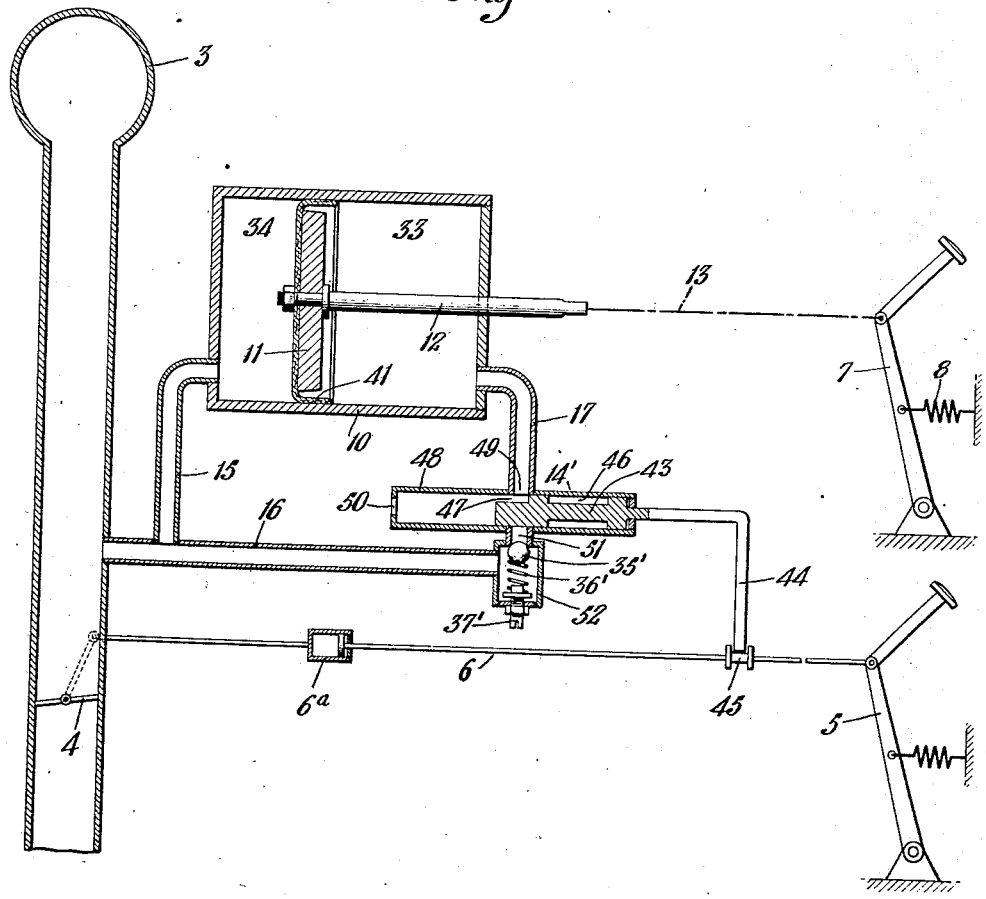

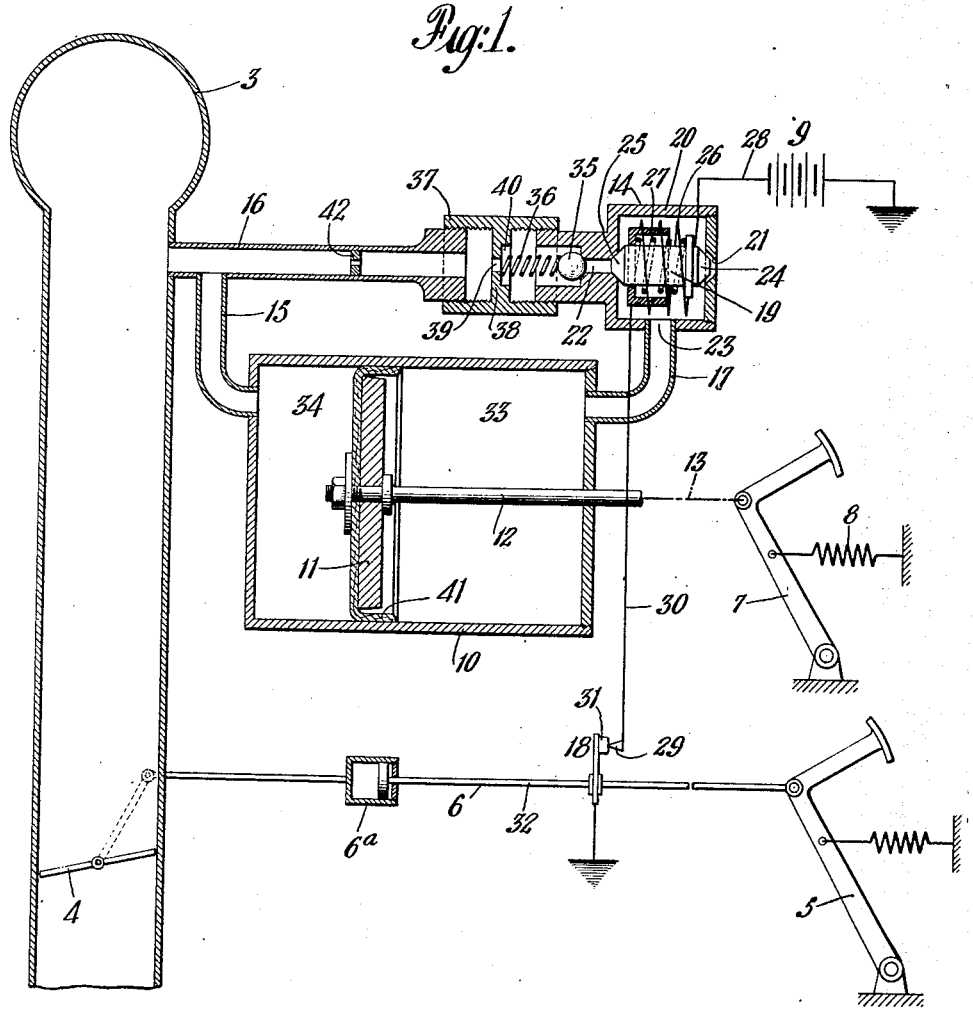

Patented Oct. 9, 1934

1,976,402

UNITED STATES PATENT OFFICE 1,976,402

POWER OPERATED MECHANISM

Hans Jander, Berlin, Germany, assignor to Knorr-Bremse Aktiengesellschaft, Berlin, Germany, a corporation of Germany Application March 31, 1933, Serial No. 663,753
In Germany January 4, 1933

8 Claims. (Cl. 192—.01)

This invention relates to power operated mechanisms and is particularly useful for the power operation of automobile clutches in connection with which it will be described.

One of the primary objects of my invention is the provision of a fluid operated power mechanism in which certain desirable actions are obtained and controlled through means responsive to pressure conditions in the mechanism.

Another object resides in the provision of a novel control valve device for fluid operated power mechanisms.

Still another object resides in the provision of a fluid operated cylinder and piston mechanism in which the action of the piston is controlled by means responsive to pressure conditions existing in the cylinder at the opposite sides of the piston.

A more specific object resides in the provision of a fluid operated power mechanism for automobile clutches including improved means whereby smooth and effective clutch engagement is ensured under the varying operating conditions of automobiles.

A further object resides in the provision of a very simple, inexpensive, and extremely effective control device for power operated mechanisms of the character described.

How the foregoing, together with such other objects and advantages as may hereinafter appear, or are incident to my invention, are realized, is illustrated in preferred form in the accompanying drawings, wherein—

Figure 1 is a more or less diagrammatic elevational view partly in section illustrating one embodiment of my invention, and Figure 2 is a similar view illustrating a modification of the invention.

In the drawings I have illustrated my invention as applied for operating the clutch of an automobile of which only certain parts are shown, for example, the intake manifold 3, throttle valve 4 located between the carburetor (not shown) and the engine, an accelerator 5 for operating the throttle valve 4 and connected thereto by means of linkage 6 in which a lost motion connection 6a is provided, a clutch pedal or actuator 7 for the clutch of the automobile adapted to be spring urged to clutch engaging position as by means of a spring 8, and a battery 9.

The power mechanism for operating and controlling the clutch comprises in general a power cylinder 10, a piston 11 having a piston rod 12, means indicated by the dot and dash line 13 for connecting the piston 11 to the clutch actuator 7 which may be in the form of a suitably guided cable connected at one end to the piston rod 12 and at the other end to the clutch actuator, a control valve device indicated as a whole by the reference numeral 14, a conduit 15, in this instance leading from the left-hand end of the cylinder 10 to a conduit 16 which is connected at one end to the intake manifold 3 and at the other end to the valve device 14, a conduit 17 leading from the other end of the cylinder 10 to the valve device 14, and a switch device 18 associated with the accelerator for effecting certain control of the valve device 14.

The valve device 14 comprises a valve 19 located in a valve casing 20 which is provided with a pair of aligned axially spaced ports 21 and 22, and a port 23 for the conduit 17. The ports 21 and 22 are each provided with valve seats, and the valve 19 is provided with aligned axially spaced valve portions 24 and 25 adapted to cooperate with the valve seats of the ports 21 and 22. The axial spacing of these valve portions is such that when the valve 19 is in its left-hand position, as shown in the drawings, the port 22 is closed and the port 21 opened, and when in its right-hand position the port 21 is closed and the port 22 opened.

In this instance I have associated an electromagnet 26 and a spring 27 with the valve 19 in such manner that when the electromagnet is energized the valve is moved to the position shown in the drawings to open the port 21 and close the port 22, and when it is deenergized the spring 27 causes the valve to move to its other position in which the port 22 is opened and the port 21 closed.

One end of the coil of the electromagnet 26 is connected to the battery 9 by means of a wire 28, and the other end thereof is connected to the fixed contact 29 of the switch device 18 by means of the wire 30. The other contact 31 of the switch device 18 is carried by the rod 32 of the accelerator linkage 6, and as shown in the drawings, is grounded. The contacts 29 and 31 are so relatively located that when the accelerator is in its released position a circuit is completed from the battery 9 to the grounded contact 31 over the wire 28, the coil of the electromagnet 26, the wire 30, and the contact 29, thus causing energization of the electromagnet and movement of the valve 19 into the position shown. With the valve in this position atmospheric air is free to enter the right-hand portion or chamber 33 of the cylinder 10 through the port 21, the interior of the valve casing 20, port 23, and conduit 17. Since the port 22 is closed when the valve is in the position just mentioned, it will be seen that the piston 11 is moved to the left under the influence of the vacuum in the manifold 3 through the medium of conduits 16 and 15 which permit vacuum to be created in the left-hand end portion or chamber 34 of the cylinder 10. In this movement of the piston the force of the spring 8 is overcome and the clutch actuator 7 is moved to the left to effect clutch disengagement. When the accelerator is depressed the contacts 31 and 29 are separated, thus breaking the circuit and causing deenergization of the electromagnet 26 which in turn causes the valve 19 to move into its position of closing the port 21 and opening the port 22 under influence of the spring 27. Thus the chamber 33 of the cylinder 10 is no longer in communication with the atmosphere although the chamber 34 is still in communication with the intake manifold of the engine.

When the valve 19 is in the position just mentioned, clutch engagement is to be effected, but it is pointed out that the engagement is also under control of another valve of the device 14 which, in this instance, is shown as a ball valve 35 adapted to open and close the port 22. This valve is normally pressed to its seat by a spring 36, the tension of which may be adjusted as by means of an adjusting nut 37 having screw threaded engagement at one end with the valve casing 20 and at the other end with the conduit 16. This nut 37 is provided with a central web 38 having an opening 39 therein and a seat 40 for the spring 36.

Generally stated, whenever the valve 35 is open and the valve 19 in its position of closing the atmospheric port 21 and opening the port 22, the chamber 33 of the cylinder 10 is put in communication with the intake manifold 3 of the engine, and whenever the valve 35 is closed such communication is cut off. The conditions under which the valve 35 opens and closes will now be described.

Assuming now that the clutch has been disengaged in the manner above mentioned by releasing the accelerator 5, and a gear selection made in the usual transmission of the automobile, and that it is desired to cause movement of the automobile, then the accelerator is normally depressed slowly and this causes operation of the switch device 18 and valve 19 in the manner above described, and puts the power mechanism in condition to effect clutch engagement, i. e., the atmospheric port 21 is closed and the port 22 is opened and put in communication with the conduit 17.

Since it is customary to depress the accelerator slowly in starting the automobile the value of the vacuum in the intake manifold 3 and in the chamber 34 does not change substantially over that of an idling engine, and therefore the valve 35 opens due to the difference of pressure in the cylinder chambers 33 and 34, there being atmospheric pressure in the chamber 33 and on the valve 35 in a direction tending to unseat it, and sub-atmospheric pressure in the chamber 34, and pipe 16 also tending to unseat the valve 35, and the difference in pressure being such that the spring 36 will be overcome. When the valve 35 is thus in its open position the air in chamber 33 begins to be drawn out and the pressure therein lowered, and therefore the clutch actuator 7 moves rapidly to the right, i. e., in the direction of clutch engagement under influence of the spring 8.

This rapid movement continues until the clutch elements come into initial contact with each other at which time a certain relief of the spring 8 takes place. During this, however, valve 35 is still maintained open because while there is a tendency to lower pressure in chamber 33, the piston in being moved to the right by spring 8 tends to maintain the pressure by decreasing the volume of the chamber, thus holding valve 35 open. Since the relief of the spring 8 causes a slowing up of the piston the air in chamber 33 is exhausted and there is a tendency to equalize pressures on both sides of the piston, whereupon valve 35 closes under influence of its spring. The further engagement action of the clutch then takes place with a slight slippage as by this time the accelerator is further depressed to further open the throttle, and the value of the vacuum in the intake manifold decreases because the engine lags behind, so to speak, in accordance or in proportion to the amount and rate of throttle opening. This reduces the value of the vacuum in the chamber 34 below that of the chamber 33, or stated in terms of positive pressure, the pressure in chamber 34 is higher than in chamber 33. Under this condition complete engagement of the clutch under influence of the spring 8 is effected.

In order to prevent a jerky clutch engagement, I have provided a cup leather 41 in the pistons 11, the cupped portion of which faces the chamber 33. It will thus be seen that whenever the pressure in chamber 34 is higher than in the chamber 33, leakage from the chamber 34 to chamber 33 takes place past the piston, thus effecting pressure equalization and ensuring smooth clutch engagement. In this connection it is pointed out that due to the particular disposition of the cup leather there is no leakage from the chamber 33 to the chamber 34 under any conditions.

In the event that the accelerator is initially depressed rapidly, i. e., more than normally is the case in starting the automobile from a stand still, then the power or value of the vacuum in the chamber 34 and pipe 16 is relatively low, but the piston 11 will move rapidly in its direction of effecting clutch engagement because of the action of the spring 8. During this movement the air in the chamber 33 is compressed and when the pressure is sufficient to overcome the spring 36 the valve 35 will open. The spring 36, however, is of such tension that it is overcome substantially at the time the clutch elements initially come into engagement with each other and this, as above pointed out in connection with normal accelerator operation for starting, causes relief of the spring 8 and the valve 35 again moves to closed position. However, as the engine speeds up, the value of the vacuum in the chamber 34 and pipe 16 rises to the point where the difference in pressure between the chambers 33 and 34 is such as to overcome the spring 36, and the valve 35 again opens permitting further movement of the piston in the direction of clutch engagement and finally complete engagement is effected.

In changing to a different speed of the transmission the clutch engaging action is altered in accordance with the manner of accelerator operation, i. e., clutch engagement is faster in changing from first gear to second gear than it was in driving the automobile away in low gear from a stop, and this also applies in changing from second to third gear.

In this connection it is pointed out that in changing gear after the automobile is in motion the tendency for the automobile to drive the engine aids in setting up pressure conditions in the device such as will cause relatively rapid clutch engagement. This is due to the fact that then the value of the vacuum in the intake manifold of the engine increases, because the engine tends to take in the gas faster than it is being supplied, i. e., faster than would be the case if the engine were pulling under load. Obviously, therefore, the valve 35 opens when this value is sufficient to overcome the predetermined tension of the spring 36 and rapid clutch engagement takes place.

It will be seen from the foregoing that it is not the position of the accelerator which determines the action of the clutch in its engagement but rather the difference of pressure existing as between the chambers 33 and 34 and this, of course, depends on such factors as engine speed, engine load, and clutch load. Control of the pressure action in the chamber 33 may be afforded to some extent by restricting the port 22 somewhat or by providing a restricted port in the manifold 16 as indicated at 42 in Figure 1. This, however, merely results in a certain timing of the pressure condition in chamber 33 with respect to chamber 34. The actual time of clutch engagement always takes place when the proper and predetermined pressure condition exists in the system.

It is pointed out that there need be no adjustment provided in my device to compensate for wear of the clutch elements because the final clutch engagement is conditional on the clutch elements coming into initial contact with each other, and therefore as wear takes place the piston moves correspondingly along in the cylinder which is of a length to take care of the extra movement. It will be seen, therefore, that the device is self compensating for wear of the clutch elements.

Referring now to the modification illustrated in Figure 2, it will be seen that the control valve device 14' includes a valve 43 of the slide type which is mechanically connected to the accelerator thru the medium of the arm 44 which engages a collar 45 secured on the throttle operating rod 6.

The valve 43 is provided with a recessed portion 46 and an end cut-away portion 47 and fits a suitable valve bore in the valve casing 48 which has a side port 49 for the conduit 17, an atmospheric port 50 at one end, and a side port 51 aligned with the port 49. A ball valve 35' adapted to open and close the port 51 is located in a valve chamber 52 of the casing 48 and the conduit 16 is connected into this chamber. The valve 35' is normally pressed to its seat by means of a spring 36', the tension of which may be adjusted as by means of an adjusting screw 37'.

When the accelerator is in its released position as shown in the drawings the valve 43 is positioned to put the chamber 33 of the cylinder 10 into communication with the atmosphere thru the medium of the conduit 17, port 49, cut-away portion 47, interior of casing 48, and port 50. This will cause clutch disengagement in the manner above described in conection with Figure 1, it being noted that the port 51 is covered. Upon depression of the accelerator the valve 43 moves to the left and communication with the atmospheric port 50 is cut off and communication between the ports 49 and 51 established thru the medium of the recessed portion 46 of the valve. This conditions the parts for clutch engagement which will take place in the same manner as above described in connection with Figure 1, it being obvious that the control afforded by the valves 43 and 35' of Figure 2 is the same as that afforded by the valves 19 and 35 of Figure 1.

I claim:—

1. In a fluid operated power device, the combination of a source of operating fluid, a cylinder, a piston therein, means constantly connecting the portion of the cylinder at one side of the piston with said fluid source, a conduit leading from the portion of the cylinder at the other side of the piston to said fluid source, said conduit having an atmospheric port therein, valve means in said conduit movable to a position establishing communication from the source of fluid to the cylinder and cutting off communication with the atmosphere whereby movement of the piston is effected in one direction and movable to a position establishing communication from the cylinder to the atmosphere and cutting off communication with the fluid source whereby movement of the piston is effected in its other direction, and other valve means in said conduit for modifying the movement of the piston in one of its directions.

2. In a fluid operated power device, the combination of a source of operating fluid, a cylinder, a piston therein, means constantly connecting the portion of the cylinder at one side of the piston with said fluid source, a conduit leading from the portion of the cylinder at the other side of the piston to said fluid source, said conduit having an atmospheric port therein, valve means in said conduit movable to a position establishing communication from the source of fluid to the cylinder and cutting off communication with the atmosphere whereby movement of the piston is effected in one direction and movable to a position establishing communication from the cylinder to the atmosphere and cutting off communication with the fluid source whereby movement of the piston is effected in its other direction, and other valve means in said conduit for modifying the movement of the piston in one of its directions, said first mentioned valve means being manually controllable and said last mentioned valve means being automatic.

3. In automatic clutch operating mechanism for automobiles having an engine, and an intake manifold, the combination of a clutch actuator, a cylinder and piston mechanism, means connecting the clutch actuator to said mechanism for operation thereby, a conduit constantly maintaining one end of the cylinder in communication with the intake manifold, a conduit leading from the other end of the cylinder to said manifold, said last mentioned conduit having an atmospheric port, valve means movable to a position establishing communication between said last mentioned end of the cylinder and the atmosphere and closing communication between said end and the intake manifold whereby clutch disengagement is effected, and to a position closing the communication with the atmosphere and opening communication with the intake manifold whereby movement of the clutch in the direction of engagement is effected, and other valve means in said conduit effective when the first valve means is in the second mentioned position to control final clutch engaging action.

4. In automatic clutch operating mechanism for automobiles having an engine, and an intake manifold, the combination of a clutch actuator, a cylinder and piston mechanism, means connecting the clutch actuator to said mechanism for operation thereby, a conduit constantly maintaining one end of the cylinder in communication with the intake manifold, a conduit leading from the other end of the cylinder to said manifold, said last mentioned conduit having an atmospheric port, valve means movable to a position establishing communication between said last mentioned end of the cylinder and the atmosphere for closing communication between said end and the intake manifold whereby clutch disengagement is effected, and to a position closing the communication with the atmosphere and opening communication with the intake manifold whereby movement of the clutch in the direction of engagement is effected, and other valve means in said conduit for controlling final clutch engaging action, said other valve means being operable in response to pressure conditions in the cylinder and piston mechanism when the first valve means is in the second mentioned position.

5. In automatic clutch operating mechanism for automobiles having an engine and an intake manifold, the combination of a clutch actuator, a cylinder and piston mechanism, means connecting the clutch actuator to said mechanism for operation thereby, a conduit constantly maintaining one end of the cylinder in communication with the intake manifold, and a conduit leading from the other end of the cylinder to the intake manifold and having control means associated therewith including a valve for communicably connecting said end with the intake manifold and with the atmosphere to effect clutch engagement and disengagement and a pressure differential controlled valve for controlling the clutch engaging action.

6. In a vacuum operated piston and cylinder mechanism the combination of a source of vacuum, a conduit connecting one end of the cylinder of said mechanism to said vacuum, a conduit connecting the other end thereof to said vacuum, a main control valve in one of said conduits operable to effect movement of the piston of said mechanism in either direction, and a spring loaded supplementary valve normally tending to be seated against vacuum and opened by differential pressure conditions of a predetermined value brought about by the piston.

7. In a vacuum operated piston and cylinder mechanism the combination of a source of vacuum, a conduit connecting one end of the cylinder of said mechanism to said vacuum, a conduit connecting the other end thereof to said vacuum, a main control valve in one of said conduits operable to effect movement of the piston of said mechanism in either direction, and a supplementary valve in said last mentioned conduit for modifying movement of the piston in one direction, said supplementary valve being automatically operable in accordance with pressure conditions brought about by the piston, said piston having a cup leather the cupped portion of which faces toward the end of the cylinder having the conduit in which said valves are located.

8. In a vacuum operated piston and cylinder mechanism the combination of a source of vacuum, a conduit connecting one end of the cylinder of said mechanism to said vacuum, a conduit connecting the other end thereof to said vacuum, a main control valve in one of said conduits operable to effect movement of the piston of said mechanism in either direction, and a spring loaded supplementary valve normally tending to be seated against vacuum and opened by differential pressure conditions of a predetermined value brought about by the piston, said piston having a cup leather arranged to effect equalization of pressure in the cylinder under predetermined conditions of operation.

HANS JANDER.